(12) United States Patent
Amano

(10) Patent No.: US 7,200,195 B2
(45) Date of Patent: Apr. 3, 2007

(54) RECEIVED DATA RECOVERING DEVICE

(75) Inventor: Shigeru Amano, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 742 days.

(21) Appl. No.: 10/373,077

(22) Filed: Feb. 26, 2003

(65) Prior Publication Data
US 2004/0081265 A1 Apr. 29, 2004

(30) Foreign Application Priority Data
Oct. 23, 2002 (JP) .............................. 2002-308124

(51) Int. Cl.
*H04L 7/00* (2006.01)
(52) U.S. Cl. .................. 375/355; 375/354; 714/12
(58) Field of Classification Search ................ 375/355, 375/354; 714/12
See application file for complete search history.

(56) References Cited

U.S. PATENT DOCUMENTS

| | | | |
|---|---|---|---|
| 5,535,252 A * | 7/1996 | Kobayashi | 375/371 |
| 5,861,925 A * | 1/1999 | Fujitaka | 348/465 |
| 6,266,378 B1 * | 7/2001 | Jeon | 375/262 |
| 6,327,319 B1 * | 12/2001 | Hietala et al. | 375/374 |
| 6,563,897 B1 * | 5/2003 | Kitta | 375/375 |
| 6,956,921 B1 * | 10/2005 | Hansson | 375/373 |
| 2002/0080898 A1 * | 6/2002 | Agazzi et al. | 375/355 |
| 2003/0210755 A1 * | 11/2003 | Franca-Neto | 375/354 |

FOREIGN PATENT DOCUMENTS

| | | |
|---|---|---|
| JP | 06-252964 | 9/1994 |
| JP | 09-018465 | 1/1997 |

* cited by examiner

*Primary Examiner*—Mohammed Ghayour
*Assistant Examiner*—Erin M. File
(74) *Attorney, Agent, or Firm*—Rabin & Berdo, PC (57) ABSTRACT

A received data recovering device that can follow a rapid change in phase of data in data communication, thereby to prevent lowering of the data transmission efficiency, samples a baseband signal in a shift register group of a clock phase detecting circuit using an N-times (N is an integer equal to or greater than 2) frequency relative to the baseband signal, and outputs to a field phase detecting circuit the number of bits required by each of fields per N, the field phase detecting circuit detecting not only a synchronization word, but also error data with respect to fields of a packet header and a Forward Error Correction (FEC) code depending on existence of data and outputting optimum clock phase information to a First In First Out (FIFO).

16 Claims, 11 Drawing Sheets

RECEIVED DATA RECOVERING DEVICE

BACKGROUND OF THE INVENTION

1. Field of the Invention

The present invention relates to a received data recovering device, for example, a device for receiving a baseband signal of serial data, or the like.

2. Description of the Related Art

The radio communication standard called Bluetooth (™) uses a 2.4 GHz radio frequency band. This band is a frequency band with no license required, and has been used in the IEEE (Institute of Electrical and Electronics Engineers) 802.11b standard employed in radio LANs (Local Area Networks) and the like, and also used for radiowaves produced in microwave ovens. Inasmuch as it is used in devices or apparatuses over a wide range as noted above, a possibility can not be avoided that radiowaves emitted from the devices or apparatuses interfere with each other. Therefore, when using this band, an influence of radiowave interference should be taken in account.

As is common in many radio systems, a signal of the Bluetooth standard is down-converted from an RF (Radio Frequency) band to an intermediate frequency band upon reception at a receiving device via a radio territory (space). Then, the receiving device demodulates the down-converted signal, and quantizes or digitizes the demodulated signal in an amplitude direction. Through the foregoing successive processing, the receiving device recovers only the binary digital data.

In this event, a clock signal for sampling the data in the receiving device is not transmitted from a transmitting device along with the data to be recovered. Therefore, the receiving device extracts a clock component from the received data in a baseband receiving section. By sampling the received data using the recovered clock signal, the receiving device converts the temporally continuous data into data of a format that can be handled as information.

There are available many methods for extracting the clock component from the received data. In general, the clock component is extracted by sampling several times change points of the received data and averaging obtained phase information of the change points. In the receiving device, the thus simply extracted clock signal has been used as sampling clocks to sample the received data.

The foregoing clock extracting method, is suitable to sample, for example, such received data whose change point phase does not vary widely in terminals or the like. There are those instances, however, where due to an influence of radiowave interference or the like, the clock extraction of the Bluetooth standard is carried out when large changes occur in phases exhibited by the change points of the received data, or at independent timings in individual devices. The clocks produced through such an operation cause limitation to the performance of the terminals of the Bluetooth standard. Further, if a system that implements communications according to the Bluetooth standard is constructed using those terminals, the system can not fully demonstrate the performance relative to a specification of the system, and thus the performance limit is caused.

Further, since the terminal aims to perform the clock extraction from a small change in phase, there are those instances where even if the terminal detects a synchronization word located at a beginning part of the received data, when a rapid phase change occurs thereafter, it can not follow this phase change. In this event, in the terminal, if more than a correctable number of errors are detected through error detection processing applied to an intermediate or final part of the received data, this received data can not be received as effective data. As a result, the terminal needs to request retransmission of the data to a communication counterpart device or apparatus, and thus the data transmission efficiency is lowered.

SUMMARY OF THE INVENTION

Therefore, it is an object of the present invention to provide a received data recovering device that can follow a rapid change in phase of data in data communication, thereby to prevent lowering of the data transmission efficiency. A receiving device over-samples a baseband signal in a shift register group of a clock phase detecting circuit using an N-times (N is an integer equal to or greater than 2) frequency relative to the baseband signal frequency, and outputs to a field phase detecting circuit the number of bits required by each of fields per N. In the field phase detecting circuit, not only hitherto detection of a synchronization word is implemented, but also detection of error data with respect to fields of a packet header and an FEC (Forward Error Correction) code is implemented depending on existence of data. While confirming that correct reception is implemented per field, by performing the foregoing detection, the optimum clock phase is determined and corresponding clock phase information is outputted to a FIFO, thereby to more stabilize a received symbol read out from the FIFO.

DETAILED DESCRIPTION OF THE PREFERRED EMBODIMENT

Now, a preferred embodiment of a received data recovering device according to the present invention will be described in detail with reference to the accompanying drawings.

In this embodiment, the received data recovering device of the present invention is applied to a receiving device 10. Those portions having no direct relation to the present invention are not shown in the drawings and explanation thereof is also omitted. In the following description, signals are identified by reference symbols assigned to corresponding connection lines.

The receiving device 10 in this embodiment is a receiver based on the Bluetooth standard, and explanation of respective constituent elements thereof will be made following this standard. In a baseband signal of this standard, a 4-bit length preamble field, an access code having a 64-bit length synchronization word field and a 4-bit length trailer, a header field, and data included in a variable length payload field are transmitted in the order named from the time slot boundary per 625 μs. The receiving device 10 monitors whether or not the foregoing 64-bit length synchronization word exists in the received data and, when a self-addressed synchronization word appears, the receiving device 10 receives in the content of the subsequent payload and performs processing thereof.

Figure 1:
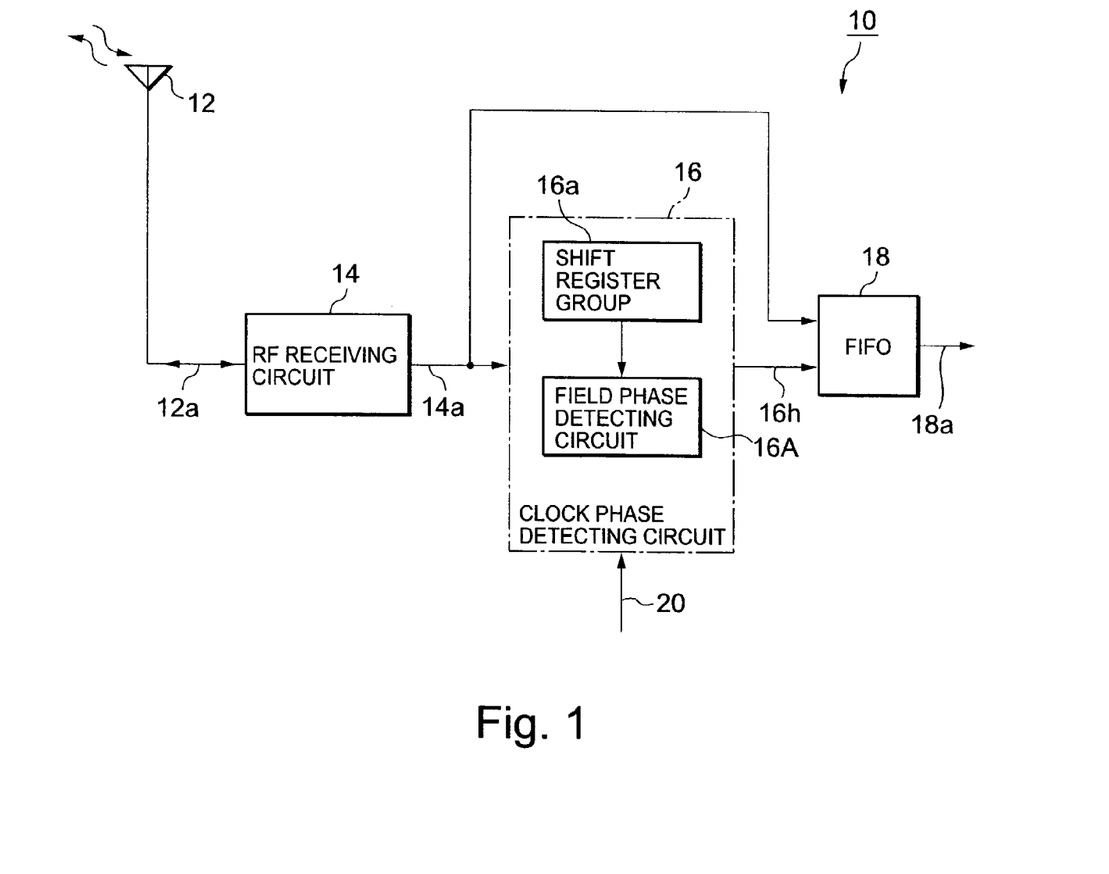
FIG. 1 is a block diagram showing a schematic configuration of a receiving device of the Bluetooth standard to which a received data recovering device of the present invention is applied.

For implementing the foregoing operation, the receiving device 10 comprises, as shown in FIG. 1, an RF antenna 12, an RF receiving circuit 14, a clock phase detecting circuit 16 and a FIFO (First-In First-Out) 18. The RF antenna 12 receives radiowaves of 2.4 GHz that is a frequency band handled by the Bluetooth standard. The received radio signal 12a is fed to the RF receiving circuit 14.

The RF receiving circuit 14 has a function of down-converting the received 2.4 GHz radio signal 12a to a 1 MHz baseband signal 14a for demodulation thereof. The frequency of the baseband signal 14a represents a received symbol transmission speed. The RF receiving circuit 14 comprises an RFIC (Radio Frequency Integrated Circuit) transceiver that performs the former function of the foregoing receiving functions, and a baseband receiving circuit that performs the latter function thereof (these elements are not shown). The RF receiving circuit 14 outputs the obtained baseband signal 14a to the clock phase detecting circuit 16.

Figure 2:
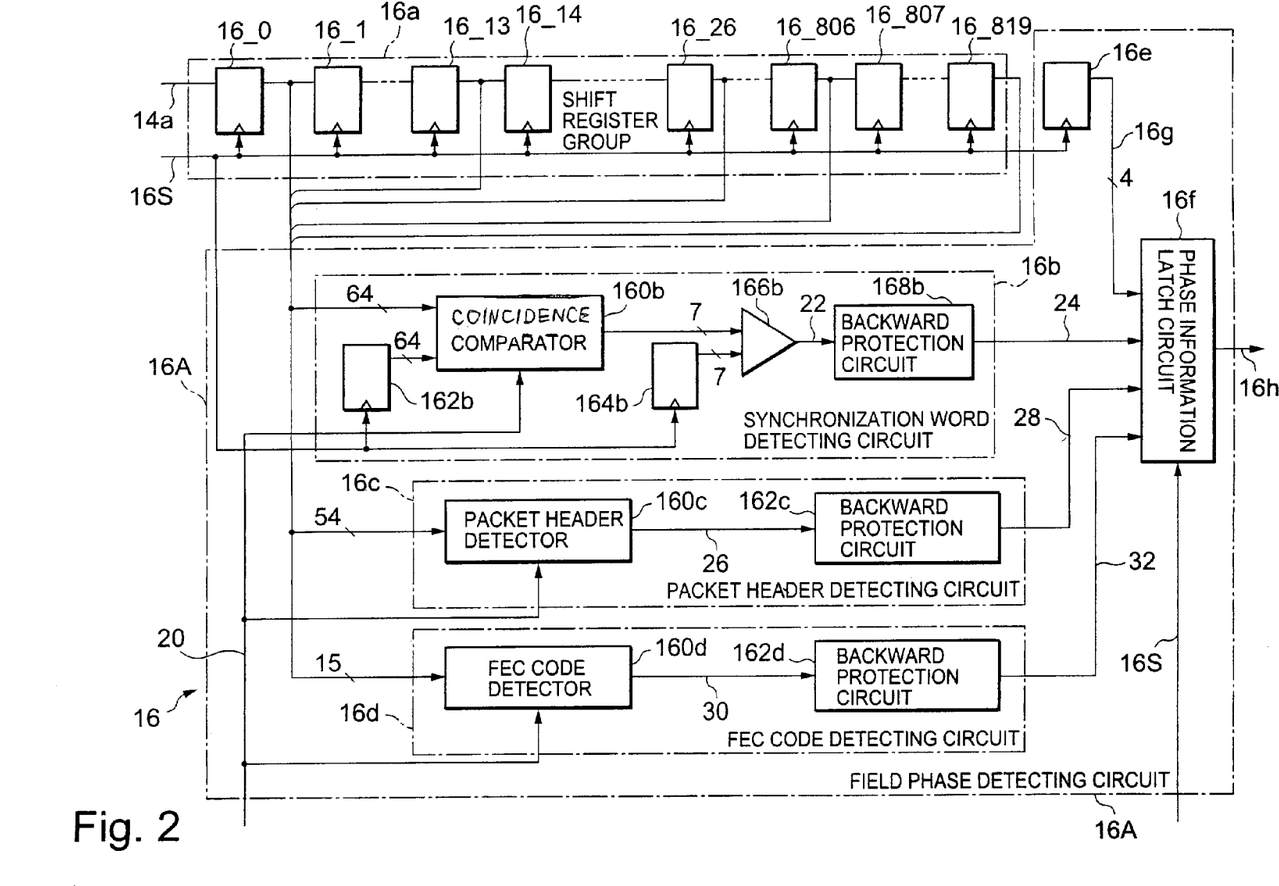
FIG. 2 is a diagram showing a connection relationship between FIG. 3 and FIG. 4 in a clock phase detecting circuit shown in FIG. 1.

As described later, the clock phase detecting circuit 16 has a function of selectively performing detection of a synchronization word, a packet header and a forward error correction code in sequence using a later-described circuit selecting signal 20, and outputting to the FIFO 18 optimum clock phase information obtained depending on the respective detection. The clock phase detecting circuit 16 comprises a shift register group 16a (phase sampling storing means) and a field phase detecting circuit 16A (optimum phase detecting means). For explaining the configuration further concretely, the clock phase detecting circuit 16 is illustrated in a divided fashion as shown in FIGS. 3 and 4, and a connection relationship between FIGS. 3 and 4 is explained as shown in FIG. 2.

Figure 3:
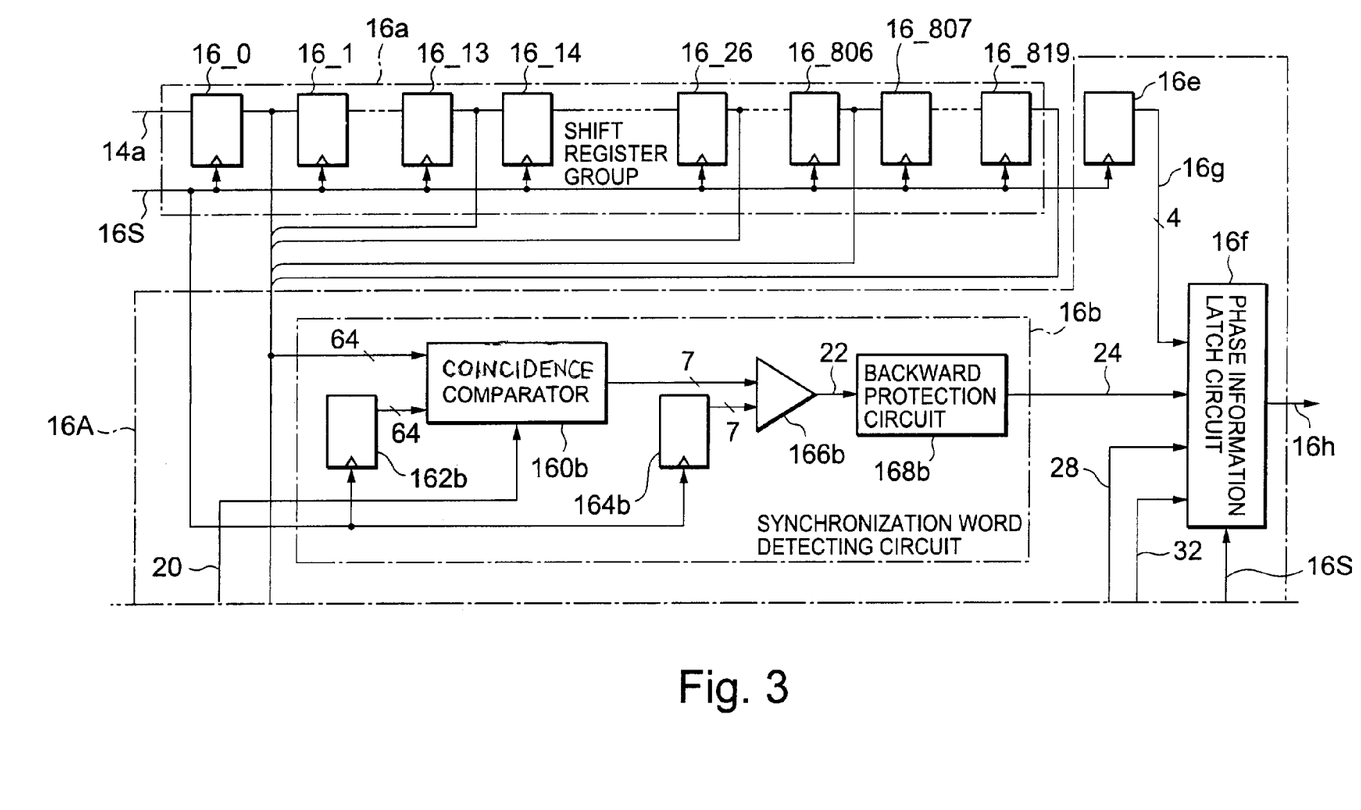
FIG. 3 is a block diagram showing a schematic upper-half configuration in the clock phase detecting circuit of FIG. 1.
Figure 4:
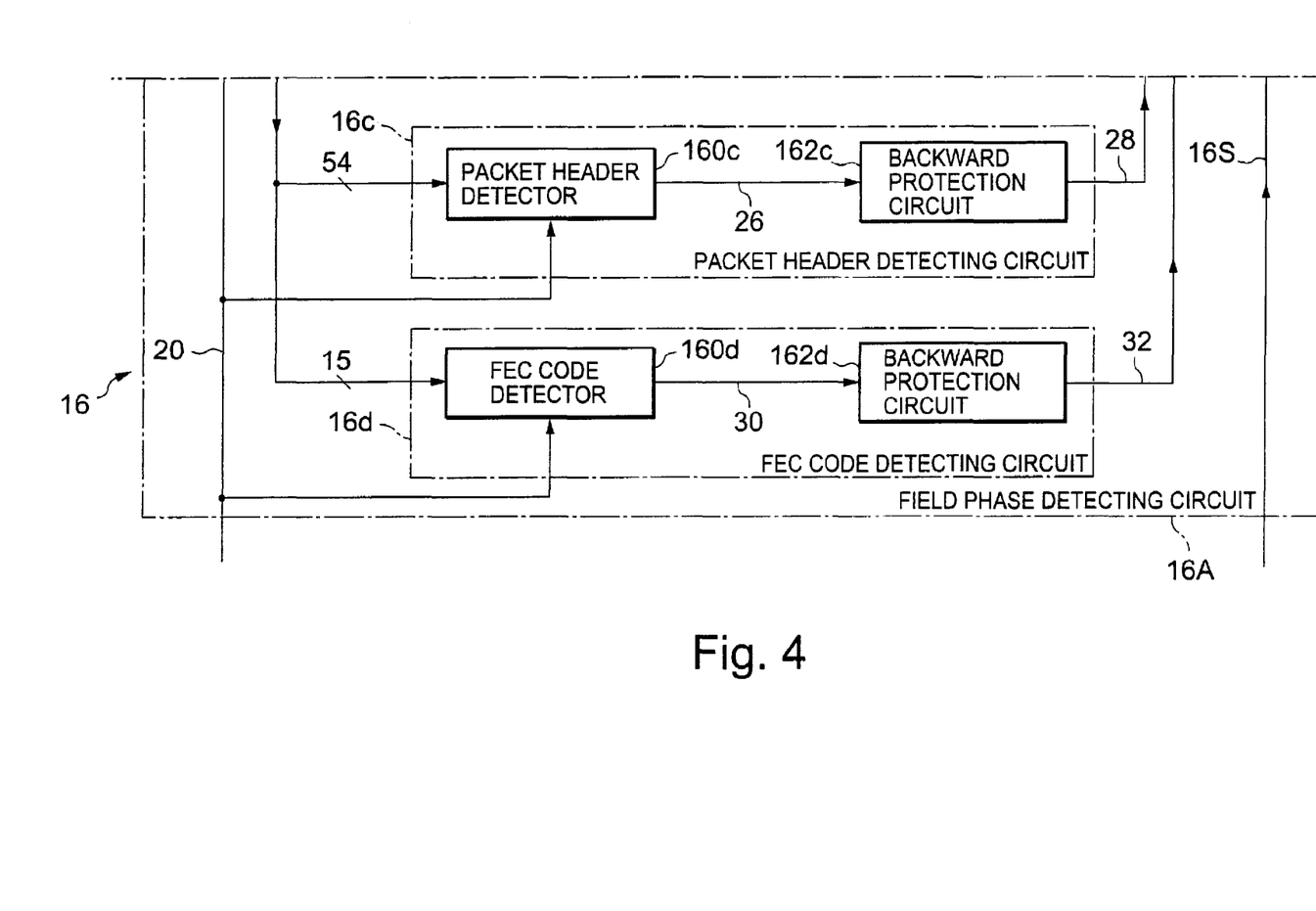
FIG. 4 is a block diagram showing a schematic lower-half configuration in the clock phase detecting circuit of FIG. 1.

As shown in FIG. 3, the shift register group 16a is disposed in the clock phase detecting circuit 16. Further, in the field phase detecting circuit 16A, a synchronization word detecting circuit 16b shown in FIG. 3, a packet header detecting circuit 16c and an FEC code detecting circuit 16d shown in FIG. 4, and a clock phase counter 16e and a phase information latch circuit 16f shown in FIG. 3 are disposed.

The shift register group 16a of FIG. 3 comprises 820 shift registers 16_0, 16_1, . . . , 16_818 and 16_819. The shift register group 16a is inputted with the baseband signal 14a processed in the RF receiving circuit 14. The shift register group 16a shares the shift registers used in detection of a synchronization word, a packet header and a forward error correction code and performs sampling of data of the baseband signal 14a, respectively. This data sampling is carried out using a sampling signal 16S with a clock frequency equal to N-times the symbol transmission speed. Accordingly, the number of the shift registers in the group 16a amounts to a value obtained by adding one bit to the product of the number of bits obtained by excluding a final bit from the maximum number of bits and the foregoing N (N=13). Specifically, 63(bits)×13+1=820 (bits).

This is because if the final bit of the synchronization word is taken in at least once using the sampling signal 16S, the synchronization word can be detected and thus only one is enough. Other than the synchronization word detection, the shift register group 16a is used also with respect to packet header detection and FEC code detection. Specifically, 54 bit length is used in the packet header detection and 15 bit length is used in the FEC code detection, both of which are shorter than 64 bit length of the synchronization word. Accordingly, parts of the shift registers corresponding to 820 bits of the shift register group 16a are used as they are for the packet header detection and the FEC code detection. The shift register group 16a supplies tap outputs of 64 registers 16_0, 16_13, 16_26, . . . , 16_806 and 16_819, i.e. the 0-bit-th register 16_0 and the subsequent 13-bit-th register 16_13, 26-bit-th register 16_26, . . . , 806-bit-th register 16_806 and 819-bit-th register 16_819 at an interval of 13 registers between each other, to an coincidence comparator 160b in parallel.

As shown in FIG. 3, the synchronization word detecting circuit 16b comprises the coincidence comparator 160b, a wait synchronization word register 162b, a threshold value register 164b, a magnitude comparator 166b and a backward protection circuit 168b. The synchronization word detecting circuit 16b operates in response to the circuit selecting signal 20 shown in FIGS. 1, 3 and 4. Though not shown, the coincidence comparator 160b comprises 64 one-bit equality comparators and an encoder. The coincidence comparator 160b has a function of encoding 64 comparison results into 7-bit data and outputting it to the magnitude comparator 166b.

The coincidence comparator 160b is supplied, at one end side of each of the 64 one-bit equality comparators, with a symbol from the shift register group 16a corresponding to each of the 64 bits. On the other hand, at the other end side of each of the 64 one-bit equality comparators, one symbol of a prestored synchronization word is fed from the wait synchronization word register 162b. Each comparator outputs "1" when the inputs are matched with each other, while outputs "0" when the inputs are not matched with each other. Each comparator feeds the comparison result to the encoder. The encoder derives the number of the comparison results each showing match among the comparison results, converts the derived number into 7-bit data, and feeds it to the magnitude comparator 166b. The coincidence comparator 160b performs the comparison and judgment in this manner, thereby to derive a sliding correlation.

In the wait synchronization word register 162b, 64 symbols representing a pattern to be received are stored in advance as a synchronization word. The wait synchronization word register 162b outputs the 64-bit data to the coincidence comparator 160b as reference data synchronously with the sampling signal 16S. The threshold value register 164b stores therein a threshold value for judging detection of synchronization. The threshold value is preferably set to, for example, approximately 50 to 64 depending on the state of received radiowaves. The threshold value register 164b outputs 7-bit data like the output of the coincidence comparator 160b.

The magnitude comparator 166b has a function of threshold value judgment relative to the synchronization word. Specifically, the magnitude comparator 166b compares the threshold value from the threshold value register 164b and the 7-bit agreement number from the coincidence comparator 160b, and outputs a synchronization word judging signal 22 indicative of a judgment result as to whether or not the agreement number exceeds the threshold value, to the backward protection circuit 168b.

The backward protection circuit 168b has a protecting function of implementing recognition processing for the synchronization word detection so as to remove an influence of noise or frequency shift contained in the baseband signal 14a and causing the receiving device 10 to perform synchronization depending on a recognition result. Though not shown, the backward protection circuit 168b confirms, for example, as the recognition processing, that the synchronization word judging signal 22 is in the detection state continuously over prescribed cycles within one symbol period, i.e. within 13 clock cycles in the sampling signal 16S, or that the synchronization word judging signal 22 is in the detection state over prescribed cycles within a certain number of cycles. In response to this recognition, the receiving device 10 performs a synchronization operation, first determining that the synchronization word has been detected. This corresponds to, if compared, a backward protection circuit in a frame synchronization circuit. The backward protection circuit 168b feeds this output to the phase information latch circuit 16f as an actual synchronization word detection signal 24.

The packet header detecting circuit 16c shown in FIG. 4 also operates in response to the circuit selecting signal 20. The packet header detecting circuit 16c comprises a packet header detector 160c and a backward protection circuit 162c. Though not shown, the packet header detector 160c comprises an arithmetic circuit and a comparator. The arithmetic circuit performs a prescribed operation using packet header information within 54-bit data supplied from the shift register group 16a to produce packet header error check bits and feeds them to the comparator. The comparator compares, per bit, the produced packet header error check bits and packet header error check bits supplied from the transmitting device. The comparator outputs a packet header judging signal 26 to the backward protection circuit 162c when the judgment results are all in agreement.

Like the backward protection circuit 168b in the foregoing synchronization word detecting circuit 16b, the backward protection circuit 162c has a protecting function of implementing recognition processing for the packet header detection so as to remove an influence of noise or frequency shift contained in the baseband signal 14a and causing the receiving device 10 to perform synchronization depending on a recognition result. Though not shown, like the backward protection circuit 168b, the backward protection circuit 162c confirms, for example, as the recognition processing, that the packet header judging signal 26 is in the detection state continuously over prescribed cycles within one symbol period, or that the packet header judging signal 26 is in the detection state over prescribed cycles within a certain number of cycles, thereby to recognize normal data feeding. In response to this recognition, the receiving device 10 performs a synchronization operation, first determining that the packet header has been detected. When this condition is satisfied, the backward protection circuit 162c outputs an actual packet header detection signal 28 to the phase information latch circuit 16f.

The FEC code detecting circuit 16d shown in FIG. 4 operates in response to the circuit selecting signal 20. The FEC code detecting circuit 16d comprises an FEC code detector 160d and a backward protection circuit 162d. Though not shown, the FEC code detector 160d comprises an arithmetic circuit and a comparator. The arithmetic circuit performs a prescribed operation using 15-bit data supplied from the shift register group 16a to produce an FEC code and feeds it to the comparator. The comparator compares, per bit, the produced FEC code and an FEC code supplied from the transmitting device. The comparator outputs an FEC code judging signal 30 to the backward protection circuit 162d when the judgment results are all in agreement.

Here, the FEC code represents a (15, 10) shortened Hamming code in which 5-bit redundant bits are added to 10-bit payload data of a packet. Data, sound or the like a user actually exchanges is included in the payload.

Judgment on outputting the FEC code judging signal 30 is not limited to the method that judges based on the comparison, but may be carried out based on an operation result as to whether or not the FEC code is correctable per clock of the sampling signal 16S, whether or not there are no errors at all, whether or not it is possible to identify an error bit and correct that bit, or whether or not it is impossible to identify an error bit and correct that bit.

Like the foregoing backward protection circuit 168b or 162c, the backward protection circuit 162d has a protecting function of implementing recognition processing for the FEC code detection so as to remove an influence of noise or frequency shift contained in the baseband signal 14a and causing the receiving device 10 to perform synchronization depending on a recognition result. Though not shown, the backward protection circuit 162d confirms, for example, as the recognition processing, that the FEC code judging signal 30 is in the detection state continuously over prescribed cycles within one symbol period, or that the FEC code judging signal 30 is in the detection state over prescribed cycles within a certain number of cycles, thereby to recognize whether or not supplied data is normal. In response to this recognition, the receiving device 10 performs a synchronization operation, first determining that the FEC code has been detected. When this condition is satisfied, the backward protection circuit 162d outputs an FEC code detection signal 32 to the phase information latch circuit 16f.

Referring back to FIG. 3, the clock phase counter 16e cyclically counts up within the range of "0" to "12" representing a position of the clock phase, for example, synchronously with the leading edge of the sampling signal 16S, and outputs it to the phase information latch circuit 16f. The count value of the clock phase counter 16e is expressed in 4 bits inasmuch as the maximum value is 12. This count value represents the phase state of the sample clock at that time instant and is fed to the phase information latch circuit 16f.

As shown in FIG. 3, the phase information latch circuit 16f is supplied with the synchronization word detection signal 24, the packet header detection signal 28 and the FEC code detection signal 32 as enable signals relative to the selected circuits, respectively. In this event, the phase information latch circuit 16f temporarily holds a 4-bit count value 16g representing a clock phase synchronously with the sampling signal 16S, and outputs it as clock phase information 16h indicative of the optimum clock phase in each field.

As described above, in the clock phase detecting circuit 16, the synchronization word detection signal 24 is fed to the clock phase information latch circuit 16f when the coincidence comparator 160b of the synchronization word detection circuit 16b is selected, the packet header detection signal 28 from the packet header detecting circuit 16c is fed to the clock phase information latch circuit 16f when the packet header detector 160c of the packet header detecting circuit 16c is selected, and the FEC code detection signal 32 from the FEC code detecting circuit 16d is fed to the clock phase information latch circuit 16f when the FEC code detector 160d of the FEC code detecting circuit 16d is selected. Simultaneously with such individual selection, the clock phase counter 16e can grasp whether or not the detection has been achieved in which of the clock phases, through the confirmation of the count value 16g by the clock phase information latch circuit 16f.

In the clock phase detecting circuit 16, when the number of detection cycles for performing the synchronization, i.e. the number of times of detecting the backward protection, is set to "1", each of the backward protection circuits 168b, 162c and 162d immediately feeds the synchronization word judging signal 22, the packet header judging signal 26 or the FEC code judging signal 30 as the synchronization word detection signal 24, the packet header detection signal 28 or the FEC code detection signal 32.

In view of the foregoing configuration, it can be said that the clock phase detecting circuit 16 has both the function of sampling and extracting the baseband signal 14a and the function of detecting the optimum clock phase information in each field.

Referring back again to FIG. 1, the FIFO 18 has a clock replacing function of writing using clocks synchronous with the baseband signal 14a and reading using internal clocks produced inside the receiving device 10 and, although not explained in detail, a payload decompose output function. For stably implementing the clock replacement, the FIFO 18 is fed with the optimum clock phase information 16h detected per field from the clock phase detecting circuit 16. The FIFO 18 stably outputs as a received symbol 18a an output signal that was read out using the internal clock based on the optimum clock phase information 16h per field.

The FIFO 18 is also used as, for example, a buffer that takes a frequency drift into account. The length of the buffer is determined by, for example, an allowable value of frequency drift. In case of the longest packet of the Bluetooth standard, it is approximately 3 ms. If a frequency drift of up to 5 μs is allowed in this period, the range becomes ±5 symbols. Therefore, in this case, the FIFO 18 preferably has a buffer length of 11 symbols.

The receiving device 10 may be provided with a frequency drift correction circuit at a stage prior to the FIFO 18. The frequency drift correction circuit is a circuit having a function of correcting a shift that is caused depending on whether or not the change points of the baseband signal 14a are synchronous.

Figure 5:
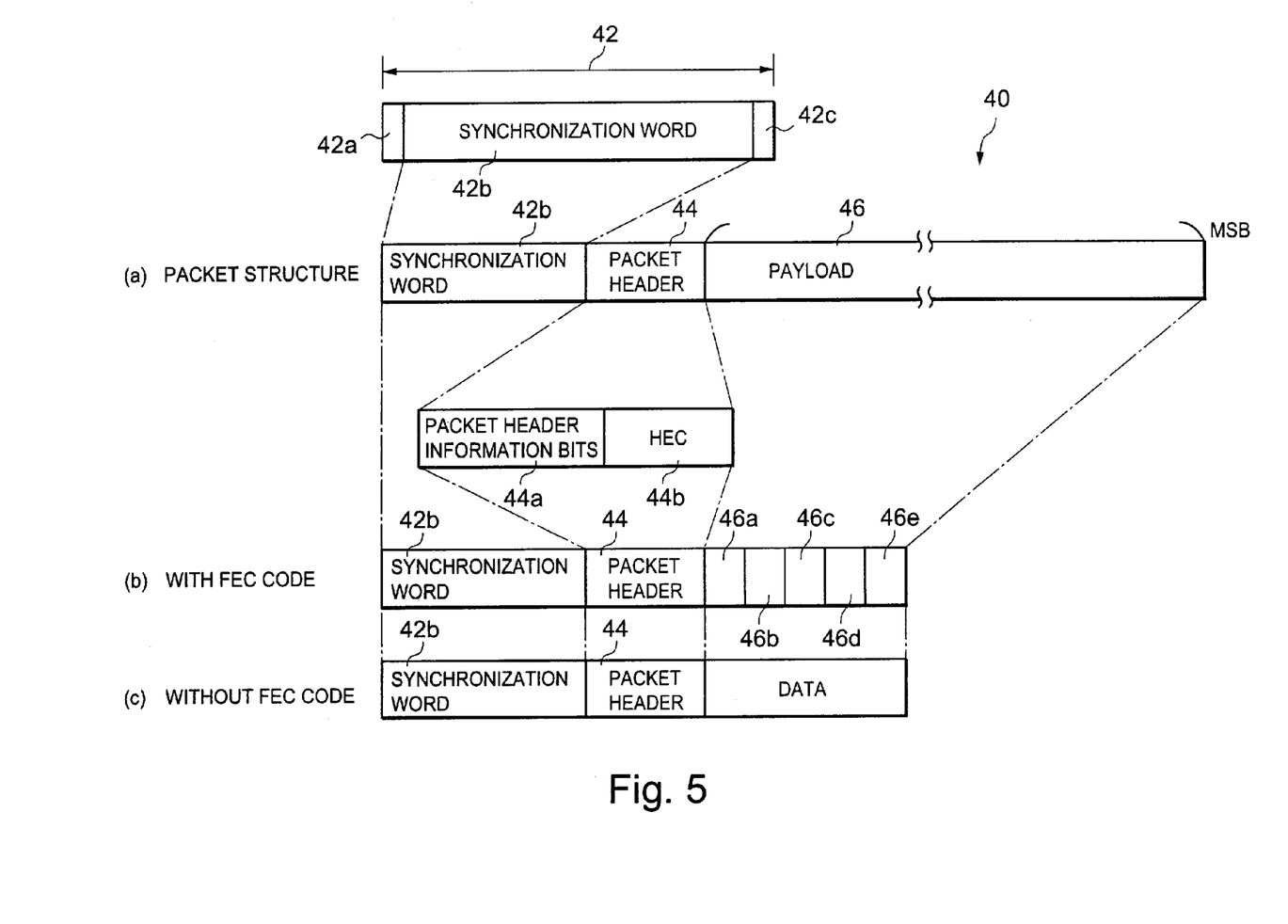
FIG. 5 is a diagram for explaining a packet structure in the Bluetooth standard handled by the receiving device.

Now, a packet data structure on the Bluetooth standard handled in this embodiment and a relationship with the circuit selecting signal 20 will be described using FIG. 5. As shown in FIG. 5 at (a), a packet 40 has an access code 42, a packet header 44 and a payload 46. The access code 42 has, in 72 bits, a 4-bit preamble 42a, a 64-bit synchronization word 42b and a 4-bit trailer 42c. The synchronization word is used as information bits set in advance for achieving synchronization.

The packet header 44 is divided into, in 54 bits, 30-bit packet header information bits 44a and 24-bit header error check bits (HEC) 44. The access code 42 and the packet header 44 each have a fixed length.

On the other hand, the payload 46 is a field for storing actual data in communication, and has a variable length wherein a field of 0 to 2745 bits can be set. If the packet 40 has the FEC code, the payload 46 of the packet 40 includes, as shown in FIG. 5 at (b), 15-bit FEC code-1, FEC code-2, FEC code-3, FEC code-4 and FEC code-5 (46a to 46e). On the other hand, as shown in FIG. 5 at (c), if the packet 40 has no FEC code, only the data is stored in the payload 46.

Inasmuch as the data structure is set beforehand with respect to the packet 40 as described above, the receiving device 10 determines the timings in order of the synchronization word, the packet header and the payload. Though not shown, the receiving device 10 produces the circuit selecting signal 20 taking into account this order and the size of the data field and, as shown in FIGS. 1, 3 and 4, feeds the circuit selecting signal 20 to the clock phase detecting circuit 16.

With this configuration, not only for the synchronization word detection, but also for the detection of the header error check bits of the packet header following the synchronization word detection or for the FEC code check of the payload with FEC when, for example, performing radio communication of the Bluetooth standard, the sampling can be implemented at the phase where the matched number is large, within the sampling signal.

Now, a relationship between the clock phase and the operation of the receiving device 10 will be described. A received packet of FIG. 6 at (a) includes a synchronization word, a packet header and an FEC code-1. In this event, when a clock phase distribution of the baseband signal is examined, the clock phases of change points relative to the synchronization word, the packet header and the FEC code-1 are distributed centering around p1, p2 and p3, respectively, as shown in FIG. 6 at (b).

Figure 6:
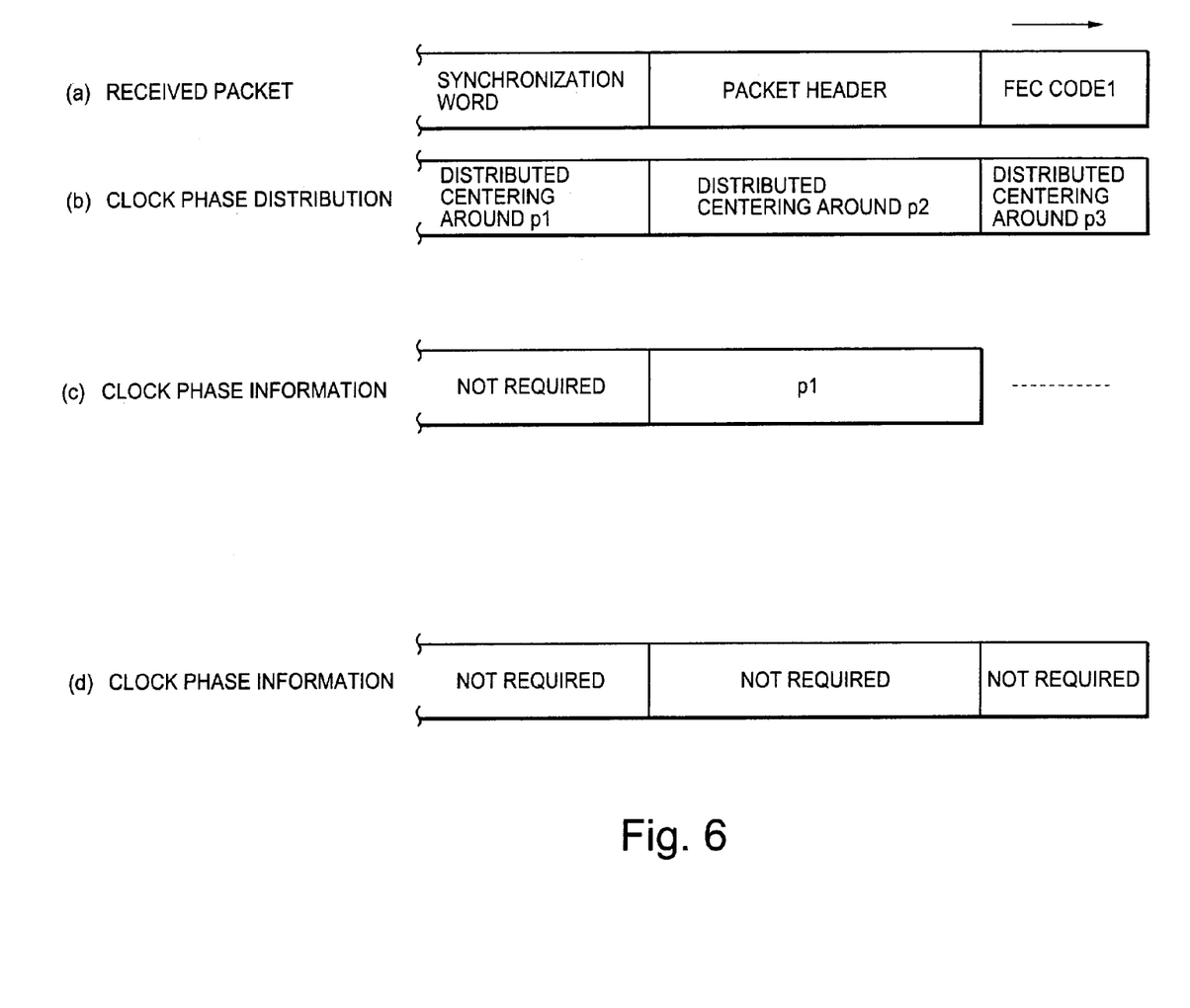
FIG. 6 is a diagram for explaining how to utilize clock phase information following clock phase distribution in the packet of FIG. 5.

Hitherto, as shown in FIG. 6 at (c), the clock phase detection at the change point does not first use the clock phase information, but compares the received synchronization word and a pattern of the synchronization word to derive the optimum clock phase p1. When the sampling is carried out with the optimum change point clock phase, even if the phase of the received data fluctuates slightly from the detected clock phase p1, the sampling can be securely implemented per bit. Here, the receiving device 10 uses the derived change point clock phase p1 fixedly, and thus utilizes the clock phase p1 with respect to not only the synchronization word, but also the subsequently supplied fields, i.e. the packet header and the FEC code-1, as the optimum clock phase.

However, as shown in FIG. 6 at (b), since the packet header is distributed centering around the clock phase p2, if the previously obtained clock phase p1 is fixedly used for the sampling, the sampling is performed with the clock phase having a different phase relationship with respect to the packet header. As a result, in the receiving device 10, if the timing fluctuates even a little, the same data is sampled twice or there arises a skipping phenomenon to omit the sampling. The receiving device 10 causes an error with respect to the packet header so that the received data can not be taken in correctly. This causes the receiving device 10 to finish the receiving operation.

Therefore, with respect to the clock phase information to be used for the sampling of the respective fields of the synchronization word, the packet header and the FEC code- 1, the receiving device 10 derives the optimum clock phases in the respective fields using a circuit that is used for the synchronization word. Accordingly, as shown in FIG. 6 at (d), the clock phase information indicates that the clock phase derived beforehand so as to correspond to each field is "not required". With this arrangement, the ascendancy not fixedly restricted is obtained with respect to a phase relationship between the sampling signal 16S and the received data (baseband signal 14a). In this manner, the receiving characteristic becomes excellent, and further, inasmuch as the circuit is shared, an occupied area of the hardware can be suppressed to a small extent. In case of the packet having the payload with no FEC code, it is controlled not to select anything after the packet header. Thus, there is no such a case where a plurality of detectors are simultaneously selected.

An operation applied to each field of a packet supplied using the clock phase detecting circuit 16 having the feature of the present invention will be described hereinbelow. First, comparison is made as a correlated state with a synchronization word pattern.

The shift register group 16a of the clock phase detecting circuit 16 is fed with the baseband signal 14a. When the ideal baseband signal 14a is inputted, the 0th bit (0th bit×13 MHz), the 13th bit (first bit×13 MHz), the 26th bit (second bit×13 MHz), . . . , the 806th bit (62nd bit×13 MHz) and the 819th bit (63rd bit×13 MHz) of the shift register group 16a are supplied to the coincidence comparator 160b as values of different symbol periods and temporarily held. Since one symbol period 50 shown in FIG. 7 corresponds to 13 periods of the sampling signal 16S (13 MHz clocks), respective values of the synchronization word are outputted from 64 register elements corresponding to 0th bit, 13th bit, 26th bit, . . . , 806th bit and 819th bit during 13 periods of the 13 MHz clocks.

Figure 7:
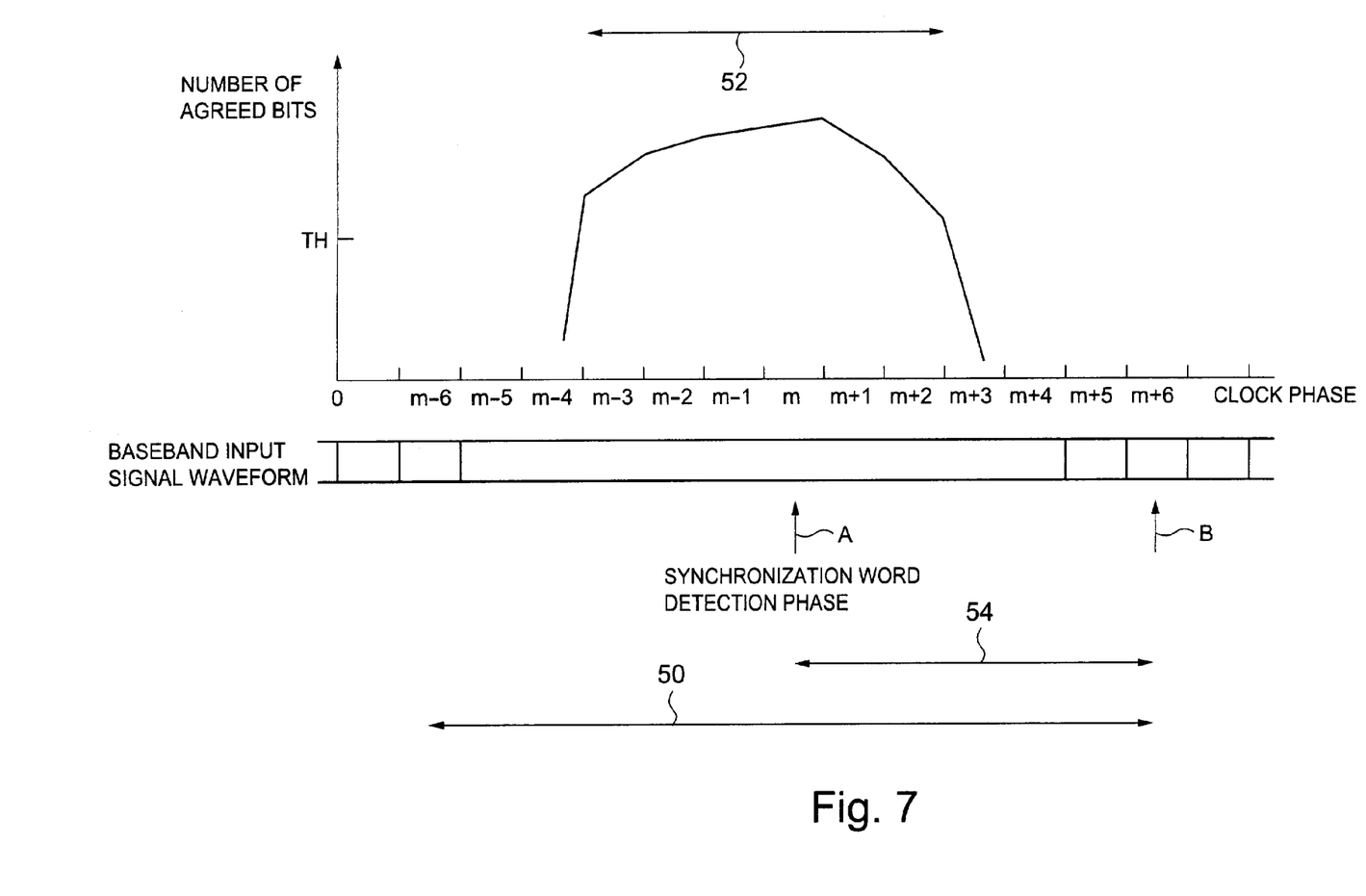
FIG. 7 is a diagram for explaining a relationship between the clock phase and the number of agreed bits in a synchronization word detecting circuit of FIG. 3.

The coincidence comparator 160b feeds the number of agreed bits through comparison to the magnitude comparator 166b. The magnitude comparator 166b is supplied with a threshold value TH from the threshold value register 164b. The comparison result of the magnitude comparator 166b is shown in FIG. 7. The clock phases where the agreed number is greater than the threshold value TH correspond to a period 52 from phase (m−3) to phase (m+2). It is assumed that the phase designated by an arrow A where the agreed number is the greatest thereamong is a synchronization word detection clock phase. That is, the clock phase m. The clock phase m is the stablest phase in the synchronization word detection and, if it is used for the clock phase of the sampling signal 16S, there is a high possibility of the stable reception. From this result, the neighborhood of a clock phase (m+6) designated by an arrow B corresponds to a boundary of a period 54 that is half the symbol period, and becomes a position where the level of the baseband signal 14a changes. It is effective for the Bluetooth standard using the 2.4 GHz band that is a fairly bad frequency band as radiowave environment.

Figure 8:
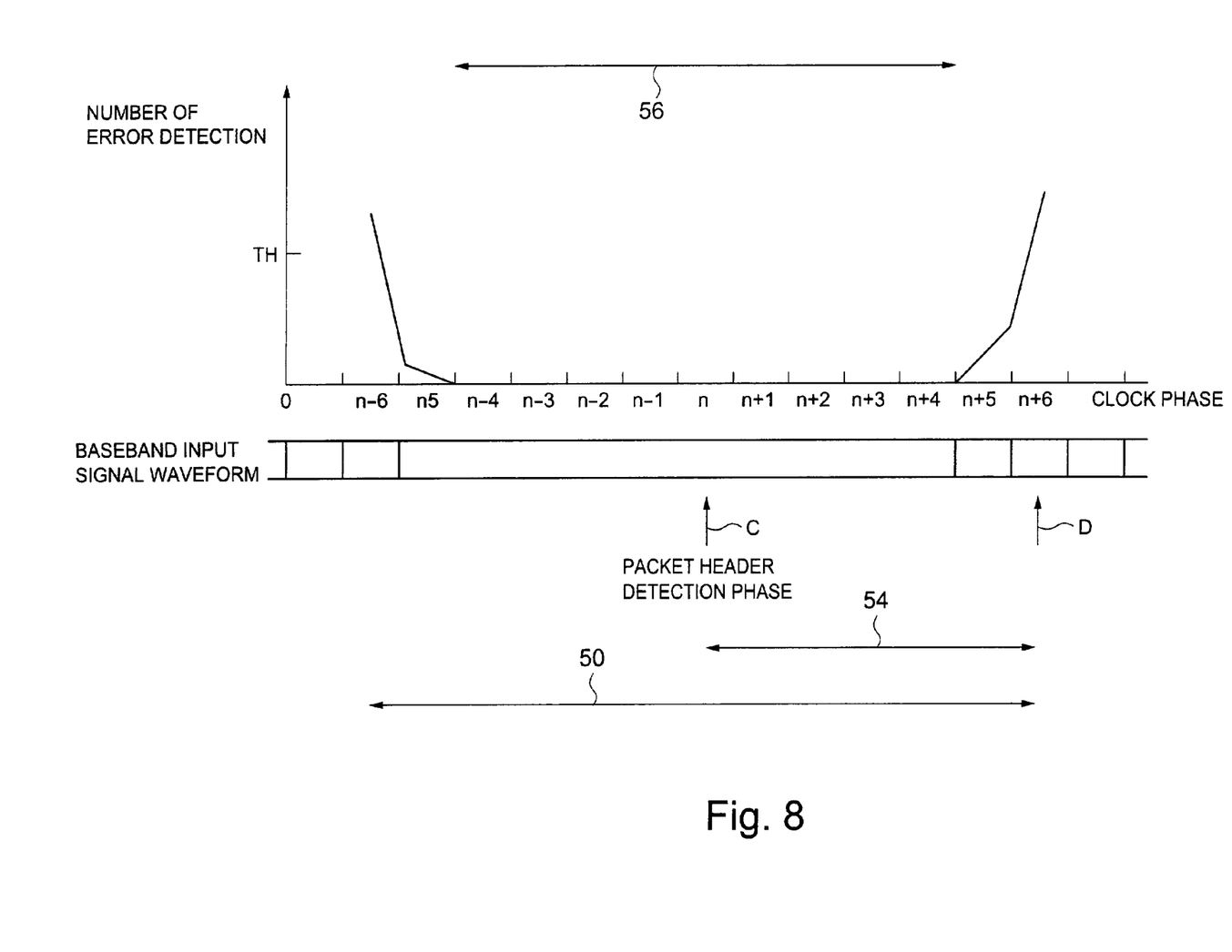
FIG. 8 is a diagram for explaining a relationship between the clock phase and the number of detection of errors of a packet header in a packet header detecting circuit of FIG. 4.

Now, an operation upon packet header reception is shown in FIG. 8. From the shift register group 16a, 54 register elements, i.e. 0th bit (0th bit×13 MHz), 13th bit (first bit×13 MHz), 26th bit (second bit×13 MHz), 676th bit (52nd bit×13 MHz) and 689th bit (53rd bit×13 MHz), are inputted to the packet header detector 160c in parallel per clock of the sampling signal 16S. This is because, as described before, the packet header is composed of 54 bits.

The packet header detector 160c is inputted with packet header information bits and header error check bits. The header error check bits are redundant bits for error detection having the same function as that of parity check bits. In the packet header detector 160c, comparison is made between header error check bits produced through operation from the packet header information bits and supplied header error check bits at the respective clock phases and, upon disagreement, an error of the packet header is confirmed in the neighborhood of the boundary of the packet header as shown in FIG. 8.

Upon the packet header detection (or confirmation), it is assumed that the packet header is detected at the center phase n, designated by an arrow C, of a period 56 where the number of errors is "0", and the phase-p phase n is set as a clock phase of the subsequent sampling signal 16S. A symbol level change occurs at a position designated by an arrow D. This increases a possibility that the packet header can be stably received. On the other hand, if there is no period where the number of packet header errors becomes "0", the packet header error is resulted and thus no detected phase exists.

Further, an operation of receiving the payload with the FEC code will be described. In this case, from the shift register group 16a, 15 register elements, i.e. 0th bit (0th bit×13 MHz), 13th bit (first bit×13 MHz), 26th bit (second bit×13 MHz), . . . , 169th bit (13th bit×13 MHz) and 182nd bit (14th bit×13 MHz), are inputted to the FEC code detector 160d in parallel per clock of the sampling signal 16S. This is because, as described before, the FEC code is composed of 15 bits.

Figure 9:
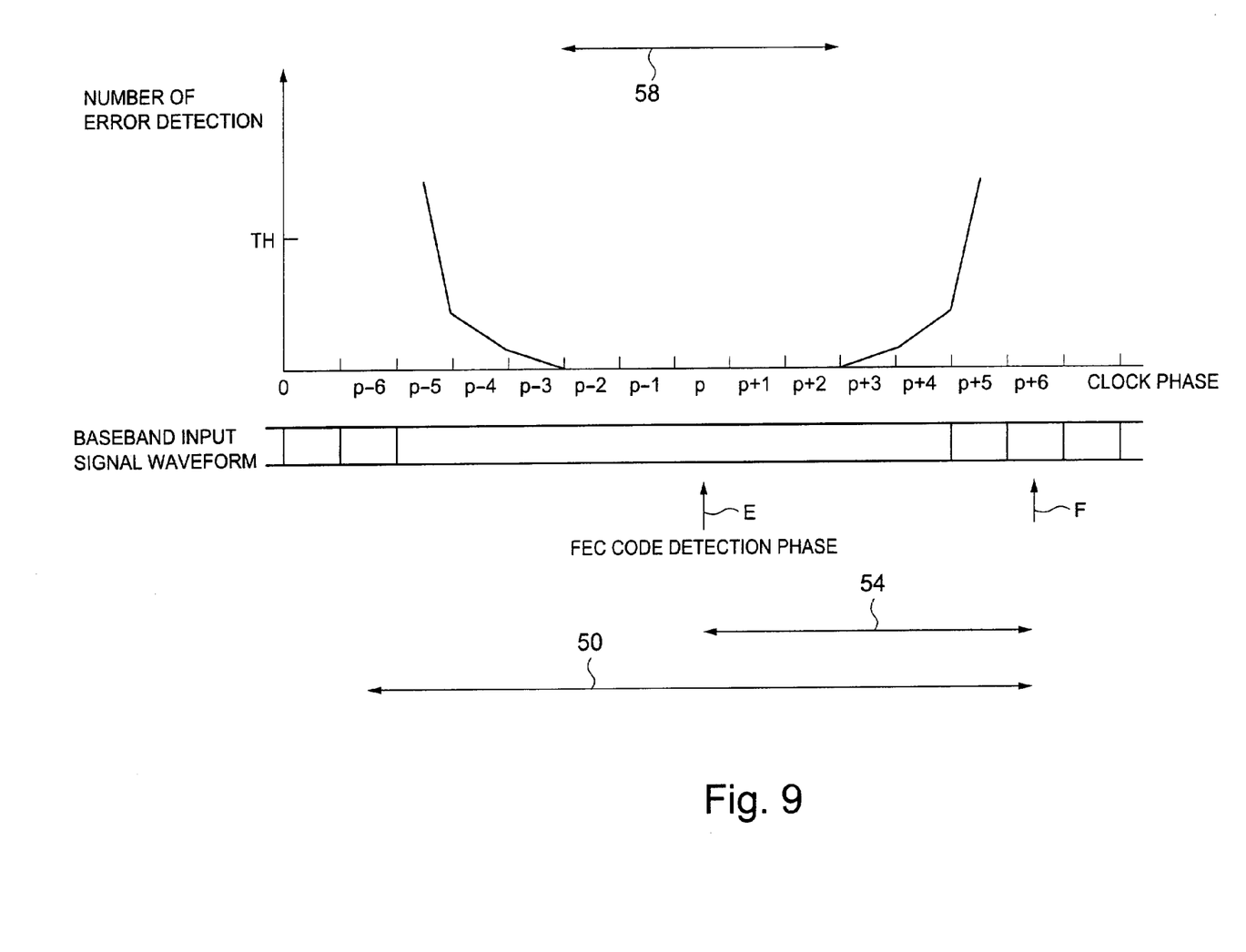
FIG. 9 is a diagram for explaining a relationship between the clock phase and the number of detection of errors of an FEC code in an FEC code detecting circuit of FIG. 4.

The FEC code detector 160d is inputted with payload data and an FEC code. The FEC code is redundant bits for error detection and correction. In the FEC code detector 160d, comparison is made between an FEC code produced through operation from the payload data and a supplied FEC code at the respective clock phases and, upon disagreement, an error of the FEC code is confirmed in the neighborhood of the boundary of the FEC code as shown in FIG. 9.

Upon the FEC code detection (confirmation), it is assumed that the FEC code is detected at the center phase p, designated by an arrow E, of a period 58 where the number of errors is "0", and the phase p is set as a clock phase of the subsequent sampling signal 16S. A symbol level change occurs at a position designated by an arrow F.

Here, with respect to the error of the FEC code, since a one-bit reception error can be corrected assuming 15 bits to be an FEC code block unit, a corrected error is not counted as an error. In the FEC code detector 160d, assuming that the FEC code is detected at the center phase p, designated by the arrow E, of the period 58, the phase p is set as a clock phase of the subsequent sampling signal 16S. A symbol level change occurs at the position designated by the arrow F. This increases a possibility of stable reception. On the other hand, if there is no term where the number of FEC code errors becomes "0", the FEC code error is resulted and thus no detected phase exists.

As described above, when the reception is performed not using the clock phase of the sampling signal determined upon the synchronization word detection, but using the clock phase of the sampling signal derived per field using the same method as that for the synchronization word detection, even if a code is mistaken an instant due to noise and accidentally sampled as an error bit at the leading edge timing of the sampling signal, it can be correctly detected at a slightly separated phase. When the sampling signal of the fixed clock phase is used, there is no remedy for correcting this clock phase shift to enable the correct reception. On the other hand, if the present invention is applied, the baseband signal 14a fed to the clock phase detecting circuit 16 can be correctly received in each field, so that the reception characteristic can also be improved.

Further, even if the optimum clock phases m, n and p of FIGS. 7 to 9 are remote from each other, the reception can be achieved correctly as described above. As a concrete example, there are those instances where the phase changes due to a clock drift or the like with respect to the optimum clock phase determined upon the synchronization word detection so that the timing becomes close between the change point of the baseband signal and the leading edge of the sampling signal. In this event, upon sampling data (baseband signal) using the sampling signal, there is caused a jitter relative to the change point so that an error is quite liable to occur.

However, the baseband signal at a remote clock phase that differs from the fixedly used optimum clock phase upon the synchronization word detection, is correct. Thus, by applying the present invention, even the baseband signal containing noise can be received correctly, thereby to improve the reception characteristic.

Through the foregoing operation, in the reception of the baseband signal subsequently to the synchronization word, by deriving the optimum clock phase per field to implement the sampling, i.e. without being fixed to the sampling signal of the clock phase that is optimum for detecting the synchronization word, the synchronization capability relative to a packet that is retransmitted or the like due to occurrence of an error can be increased significantly. Inasmuch as both effects, i.e. solidity not to receive wrong information and improvement of the reception characteristic with respect to the wrong information, can be provided simultaneously, an extremely large advantage can be obtained.

Further, by setting a block not selected by the circuit selecting signal 20 as "disable" to stop an operation thereof, the power consumption can be lowered.

Figure 10:
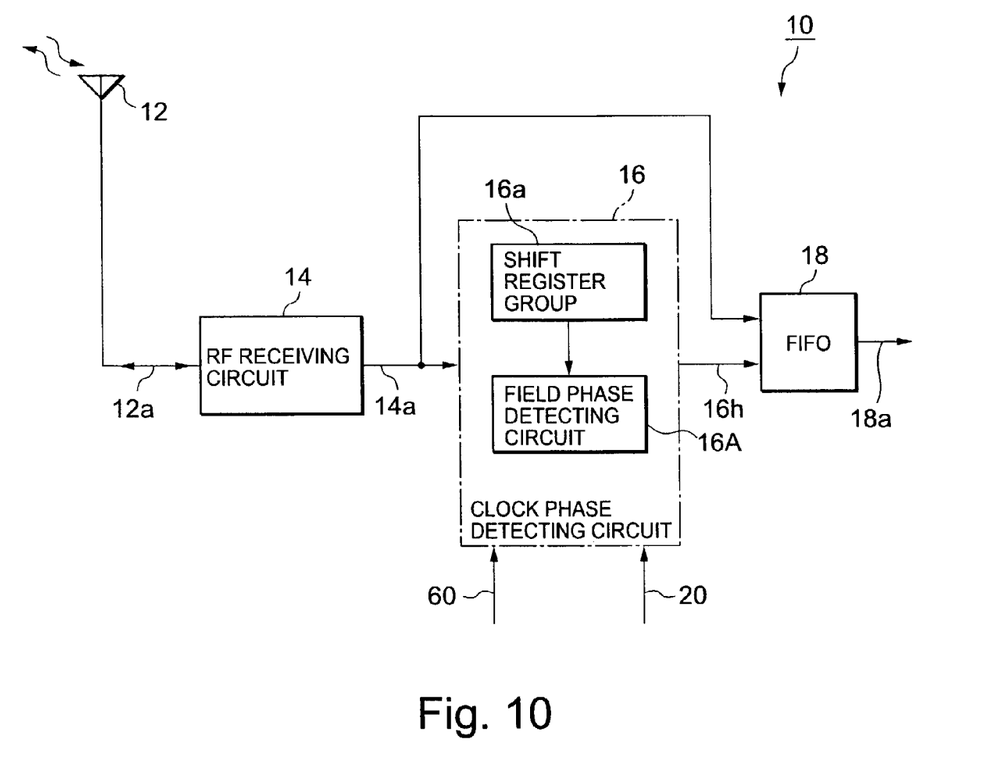
FIG. 10 is a block diagram showing a schematic configuration in a modification of the receiving device applied with the present invention.
Figure 11:
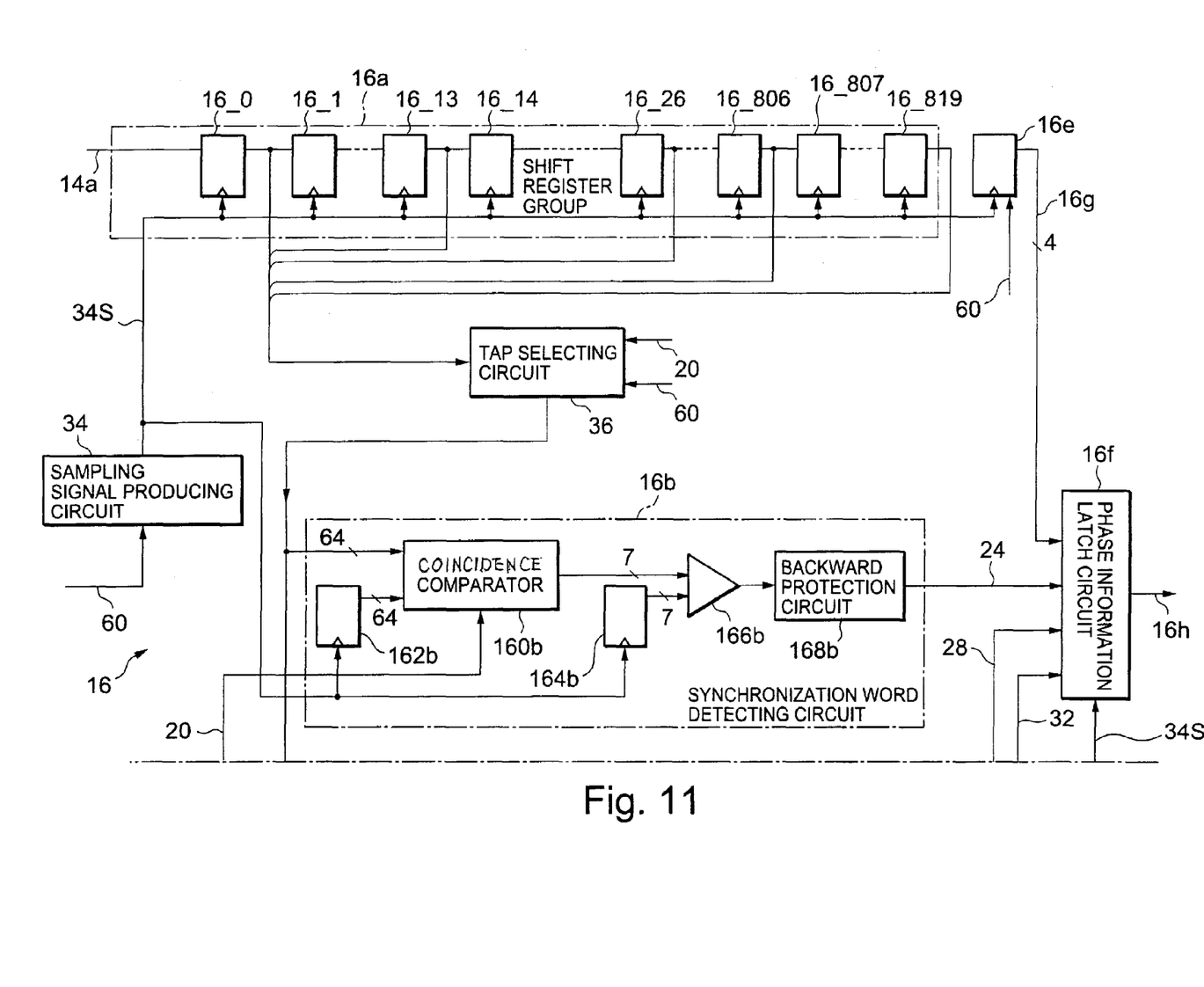
FIG. 11 is a block diagram showing a modification of the schematic upper-half configuration in the clock phase detecting circuit of FIG. 3.

Now, a modification of the receiving device 10 applied with the received data recovering device of the present invention will be described. A receiving device 10 shown in FIG. 10 comprises, like in the foregoing embodiment, an RF antenna 12, an RF receiving circuit 14, a clock phase detecting circuit 16 and a FIFO 18. The receiving device 10 differs from the receiving device 10 in the foregoing embodiment in that a clock control signal 60 is fed to the clock phase detecting circuit 16. The clock control signal 60 is a control command signal for sampling an input baseband signal 14a using an N-times sampling signal. For realizing this command, the clock phase detecting circuit 16 is provided with a sampling signal producing circuit 34 and a tap selecting circuit 36, in addition to the constituent elements of FIGS. 3 and 4.

The sampling signal producing circuit 34 has a function of outputting an N-times frequency relative to the frequency of the baseband signal. The maximum value of N is N=13 in this embodiment. This maximum value is determined by the quotient of the number of shift registers provided in a shift register group 16a divided by the number of output bits. The sampling signal producing circuit 34 has an oscillator (not shown) for producing reference clocks, and a multiplier (not shown) for multiplying the reference clocks. The multiplier is supplied with the clock control signal 60. The multiplier produces a sampling signal 34S from N-times information based on the supplied clock control signal 60, and outputs it. The sampling signal 34S is fed to each shift register of the shift register group 16a, a wait synchronization word register 162b, a threshold value register 164b, a clock phase counter 16e, the tap selecting circuit 36 though not shown, and the like, respectively.

The tap selecting circuit 36 is supplied with outputs from the shift registers 16_0, 16_1, . . . , 16_818 and 16_819 of the shift register group 16a, a circuit selecting signal 20 and the clock control signal 60, respectively. The tap selecting circuit 36 has a function of selecting the number of outputs prescribed by the circuit selecting signal 20 for cyclic processing, from 820 inputs depending on N of the clock control signal 60, and outputting it to a synchronization word detecting circuit 16b, a packet header detecting circuit 16c and an FEC code detecting circuit 16d, respectively.

In case of the maximum value, i.e. N=13, the tap selecting circuit 36 makes selection to tap per 13 inputs. On the other hand, in case of N=5, the tap selecting circuit 36 makes selection to tap per 5 inputs. Specifically, the taps hold the 0th bit, 5th bit, 10th bit, . . . , 315th bit and feeds 64 bits to the synchronization word detecting circuit 16b. On the other hand, the tap selecting circuit 36 outputs 54 bits up to the 265th bit and 15 bits up to the 70th bit to the packet header detecting circuit 16c and the FEC code detecting circuit 16d, respectively, depending on the circuit selecting signal 20.

The clock phase counter 16e in this embodiment is also given a function of changing the setting of cyclic counting-up according to the clock control signal 60. In case of sampling at 5 MHz with N=5, the clock phase counter 16e represents the phase state in the range of "0" to "4".

If the tap selecting circuit 36 is so connected as to feed the 820 outputs supplied from the shift register group 16a to the synchronization word detecting circuit 16b, the packet header detecting circuit 16c and the FEC code detecting circuit 16d, respectively, the tap selecting circuit 36 may be provided within each of the synchronization word detecting circuit 16b, the packet header detecting circuit 16c and the FEC code detecting circuit 16d.

With this configuration, detection/confirmation of the respective fields, i.e. a synchronization word, a packet header and an FEC code, can be performed using the sampling signal 34S defined by the value of N. Here, the frequency of the sampling signal 34S relative to the baseband signal 14a is not fixed by the circuit, but can be changed by setting a value of N of the clock control signal 60.

Further, the value of N can be changed upon detection of the synchronization word, upon detection of the packet header and upon detection of the FEC code, so that the optimum sampling frequency necessary for each detection can be used. With this arrangement, it is not necessary to operate the respective detecting circuits at an unnecessarily high frequency, so that the reduction of power consumption and the necessary sampling frequencies can be satisfied simultaneously.

Explanation has been made about the radio receiving device 10 of the Bluetooth standard as the embodiment. However, the present invention is not limited to the present embodiment, and is applicable all devices that receive a baseband signal of serial data. Further, in the this embodiment, as a field for detecting the clock phase, each of the fields of the packet header and the FEC code is shown in addition to the field of the synchronization word. However, the present invention is not limited to those fields, and detection of the clock phase may also be carried out depending on a time position.

With the foregoing configuration, data to be used for detection of the optimum clock phase is taken out from the shift register group 16a using the sampling signal having the frequency equal to N-times the baseband signal 14a. The synchronization word detecting circuit 16b, the packet header detecting circuit 16c and the FEC code detecting circuit 16d are disposed in parallel to each other, and the circuit to be made effective for the detecting processing is selected by the circuit selecting signal 20. Based on the error detection with respect to the received data of the fields located subsequently to the synchronization word, the optimum clock phase in each of the fields is detected, and the processing performed using the respectively detected clock phases. Accordingly, the synchronization capability relative to each field can be significantly increased, thereby to achieve the correct reception without causing an error. Therefore, the retransmission or the like from the transmitter side be avoided that has been caused by retaining the solidity for receiving information containing no error, thereby to enable retainment of the solidity and improvement of the reception characteristic simultaneously.

Data from the shift register group 16a is fed to the synchronization word detecting circuit 16b, the packet header detecting circuit 16c and the FEC code detecting circuit 16d arranged in parallel to each other, such that those circuits can be shared. Accordingly, the occupied area of the circuits can be reduced and the configuration can be simplified. By operating each of the parallelly arranged circuits depending on the selection by the circuit selecting signal 20, a circuit operation upon non-selection can be stopped to suppress the power consumption of the receiving device 10.

Further, using the sampling signal 34S produced variably in the sampling signal producing circuit 34 depending on the value of N supplied by the clock signal control signal 60, detection of the synchronization word, the packet header and the FEC code with respect to the respective fields, i.e. the synchronization word field, the packet header field and the payload field, can be implemented. The frequency of the sampling signal 34S is not fixed by the circuit, but can be changed by setting a value of N of the clock control signal 60. This means that the value of N of the clock control signal 60 is changed upon detection of the synchronization word, upon detection of the packet header and upon detection of the FEC code, so that the optimum sampling frequency necessary for each detection can be used. With this arrangement, it is not necessary to operate the respective detecting circuits at an unnecessarily high frequency, so that the reduction of power consumption and the necessary sampling frequencies can be satisfied simultaneously.

As described above, according to the data recovering device of the present invention, the rapid phase change can be followed with respect also to the respective fields subsequent to the field of the synchronization word, so that the data recovering capability can be enhanced more than before. Both retainment of the solidity and improvement of the reception characteristic can be realized simultaneously.

Further, data from the shift register group is fed to detecting means for the respective fields arranged in parallel to each other, such that those means can be shared. Accordingly, the occupied area of the circuits can be reduced and the configuration can be simplified. By operating each of the parallelly arranged circuits depending on selection by the circuit selecting signal, a circuit operation upon non-selection can be stopped to suppress the power consumption of the device applied with the present invention.

What is claimed is:

1. A received data recovering device for recovering data from an input baseband signal that represents packets having a plurality of fields, the fields including a synchronization data field and error-related data fields, said received data recovering device comprising:
   clock phase detecting means for sampling the input baseband signal using a sampling signal having a frequency N times the frequency of the baseband signal so as to provide N candidate sampling phases for each field of the baseband signal (N is an integer equal to or greater than 2), storing a sampling value for each of the candidate sampling phases, and deriving optimum clock phase information in said baseband signal for each of the fields set based on a communication standard contained in said baseband signal; and
   buffer means for receiving said baseband signal using a signal synchronous with said baseband signal, and reading out said baseband signal using said sampling signal produced based on the optimum clock phase information;
   wherein said clock phase detecting means comprises:
      phase sampling storing means for sequentially storing sampling data obtained upon sampling said baseband signal using said sampling signal; and optimum phase detecting means, responsive to data taken out from said phase sampling storing means, for selectively performing detection processing of synchronization data contained in the synchronization data field using said data and confirmation processing of error-related data supplied depending on existence of said data, and for detecting an optimum clock phase of the corresponding field so as to output it as the optimum clock phase information for the corresponding field.

2. A received data recovering device according to claim 1, wherein said optimum phase detecting means comprises:
   synchronization data detecting means for performing the detection processing of the synchronization data contained in the received data;
   error data confirming means, provided in parallel to said synchronization data detecting means, for performing confirmation processing of correct reception based on a comparison between error-related data produced by using said data taken out from said phase sampling storing means and the error-related data supplied from said phase sampling storing means;
   clock phase count means for cyclically outputting a count value outputted depending on said sampling signal, as the optimum clock phase information; and
   phase information latch means for temporarily holding said optimum clock phase information depending on a confirmation signal indicative of correct reception supplied from said optimum phase detecting means, and outputting said optimum clock phase information.

3. A received data recovering device according to claim 2, wherein said optimum phase detecting means feeds a selection signal to said synchronization data detecting means and said error data confirming means, respectively, so as to allow only a selected means to be operated.

4. A received data recovering device according to claim 2, wherein said optimum phase detecting means provides limitation protecting means in each of said synchronization data detecting means and said error data confirming means, said limitation protecting means providing a limiting condition for avoiding a wrong judgment and outputting a signal indicative of detection of the corresponding field depending on confirmation of said limiting condition.

5. A received data recovering device according to claim 2, wherein said optimum phase detecting means provides limitation protecting means in each of said synchronization data detecting means and said error data confirming means, said limitation protecting means providing a limiting condition for avoiding a wrong judgment and outputting a signal indicative of detection of the corresponding field depending on confirmation of said limiting condition.

6. A received data recovering device according to claim 3, wherein said optimum phase detecting means provides limitation protecting means in each of said synchronization data detecting means and said error data confirming means, said limitation protecting means providing a limiting condition for avoiding a wrong judgment and outputting a signal indicative of detection of the corresponding field depending on confirmation of said limiting condition.

7. A received data recovering device according to claim 2, further comprising:
sampling signal producing means, supplied with N-times information as a clock control signal from outside the received data recovering device, for producing a sampling signal equal to N-times the frequency of said baseband signal depending on a value of N represented by said clock control signal; and
tap selecting means for selecting tap outputs from said phase sampling storing means depending on the value of N of said clock control signal,
wherein said clock phase count means sets a cyclic count value so as to agree with said value of N.

8. A received data recovering device according to claim 7, wherein said sampling signal producing means is fed with the clock control signal of which said value of N is changed depending on at least one of a type of the supplied data with respect to the field and a time position of the supplied data.

9. A received data recovering device for recovering data from an input baseband signal that represents packets having a plurality of fields, the fields including a synchronization data field and error-related data fields, said received data recovering device comprising:
a clock phase detecting circuit for sampling the input baseband signal using a sampling signal having a frequency N times the frequency of the baseband signal so as to provide N candidate sampling phases for each field of the baseband signal (N is an integer equal to or greater than 2), storing a sampling value for each of the candidate sampling phases, and deriving optimum clock phase information in said baseband signal for each of the fields set based on a communication standard contained in said baseband signal; and
a First In First Out (FIFO) for receiving said baseband signal using a signal synchronous with said baseband signal, and reading out said baseband signal using said sampling signal produced based on the optimum clock phase information;
wherein said clock phase detecting means comprises: a shift register circuit group for sequentially storing sampling data obtained upon sampling said baseband signal using said sampling signal; and a field phase detecting circuit, responsive to data taken out from said shift register circuit group per N corresponding to bits to be used by a corresponding field, for selectively performing detection processing of synchronization data contained in the synchronization data field using said data and confirmation processing of error-related data supplied depending on existence of said data, and for detecting an optimum clock phase of the corresponding field so as to output it as the optimum clock phase information for the corresponding field.

10. A received data recovering device according to claim 9, wherein said field phase detecting circuit comprises:
a synchronization word detecting circuit for performing the detection processing of the synchronization data contained in the received data; a Forward Error Correction (FEC) code detecting circuit, provided in parallel to said synchronization word detecting circuit, for performing confirmation processing of correct reception based on a comparison between error-related data produced by using said data taken out from said shift register circuit group and the error-related data supplied from said shift register circuit group;
a clock phase counter for cyclically outputting a count value outputted depending on said sampling signal as the optimum clock phase information; and
a phase information latch circuit for temporarily holding said optimum clock phase information depending on a confirmation signal indicative of correct reception supplied from said field phase detecting circuit, and outputting said optimum clock phase information.

11. A received data recovering device according to claim 10, wherein said field phase detecting circuit feeds a selection signal to said synchronization word detecting circuit and said Forward Error Correction (FEC) code detecting circuit, respectively, so as to allow only a selected circuit to be operated.

12. A received data recovering device according to claim 10, wherein said field phase detecting circuit provides a backward protection circuit in each of said synchronization word detecting circuit and said Forward Error Correction (FEC) code detecting circuit, said backward protection circuit providing a limiting condition for avoiding a wrong judgment and outputting a signal indicative of detection of the corresponding field depending on confirmation of said limiting condition.

13. A received data recovering device according to claim 10, wherein said field phase detecting circuit provides a backward protection circuit in each of said synchronization word detecting circuit and said Forward Error Correction (FEC) code detecting circuit, said backward protection circuit providing a limiting condition for avoiding a wrong judgment and outputting a signal indicative of detection of the corresponding field depending on confirmation of said limiting condition.

14. A received data recovering device according to claim 11, wherein said field phase detecting circuit provides a backward protection circuit in each of said synchronization word detecting circuit and said Forward Error Correction FEC code detecting circuit, said backward protection circuit providing a limiting condition for avoiding a wrong judgment and outputting a signal indicative of detection of the corresponding field depending on confirmation of said limiting condition.

15. A received data recovering device according to claim 10, further comprising:
a sampling signal producing circuit, supplied with N-times information as a clock control signal from, outside the received data recovering device, for producing a sampling signal equal to N-times the frequency of said baseband signal depending on a value of N represented by said clock control signal; and
a tap selecting circuit for selecting tap outputs from said shift register circuit group depending on the value of N of said clock control signal,
wherein said clock phase counter sets a cyclic count value so as to agree with said value of N.

16. A received data recovering device according to claim 15, wherein said sampling signal producing circuit is fed with the clock control signal of which said value of N is changed depending on at least one of a type of the supplied data with respect to the field and a time position of the supplied data.

* * * * *